（12) United States Patent
Daisy et al.

(10) Patent No.: US 8,314,392 B2
(45) Date of Patent: Nov. 20, 2012

(54) ANTENNA FOR USE IN THZ TRANSCEIVERS

(75) Inventors: Ron Daisy, Raanana (IL); Laurent Habib, Moshav Shapira (IL)

(73) Assignee: Novatrans Group SA, Vaumarcus NE (CH)

( * ) Notice: Subject to any disclaimer, the term of this patent is extended or adjusted under 35 U.S.C. 154(b) by 0 days.

(21) Appl. No.: 12/819,353

(22) Filed: Jun. 21, 2010

(65) Prior Publication Data

US 2011/0309246 A1    Dec. 22, 2011

(51) Int. Cl.
*G01J 5/02*    (2006.01)
(52) U.S. Cl. .................................................. 250/341.1
(58) Field of Classification Search .... 250/338.1–338.5, 250/341.1–341.8
See application file for complete search history.

(56) References Cited

U.S. PATENT DOCUMENTS

| 7,659,513 | B2* | 2/2010 | Gorrell et al. | 250/341.1 |
| 2004/0155665 | A1* | 8/2004 | Arnone et al. | 324/644 |
| 2010/0276594 | A1* | 11/2010 | Rafailov et al. | 250/338.4 |
| 2011/0127431 | A1* | 6/2011 | Paek | 250/338.4 |

FOREIGN PATENT DOCUMENTS

WO    2007132459 A2    11/2007

OTHER PUBLICATIONS

Dragoman et al., "Terahertz fields and applications," 2004, Progress in Quantum Electronics, vol. 28, pp. 1-66.*
Winnerl et al., "Large-Area photoconductive terahertz detectors," 2007, The 2007 15th International Conference on THz Electronics, pp. 740-741.*

* cited by examiner

*Primary Examiner* — Kiho Kim
(74) *Attorney, Agent, or Firm* — Patentbar International, P.C.

(57)    ABSTRACT

A high frequency radiation transceiver is presented. The transceiver comprises an electrodes' arrangement, comprising two or more electrodes, where two of said electrodes are accommodated in a spaced-apart relationship defining a cavity for free space propagation of electrons between them. One of said two electrodes is configured to be responsive to an external input optical signal to emit an electron flux towards the other electrode. Said two or more electrodes are configured to define first and second electrode portions, the first portion having at least a region thereof exposed to said electron flux and operable as an antenna feeding port causing an electric current in said second portion and the second portion being configured and operable as an antenna radiating portion.

29 Claims, 5 Drawing Sheets

ANTENNA FOR USE IN THZ TRANSCEIVERS

FIELD AND BACKGROUND OF THE INVENTION

This invention relates to a THz transceiver, i.e. emitter and/or receiver of radiation in a THz regime. The THz regime is commonly defined as the range from 300 GHz to 10 THz, corresponding to wavelengths between 1 mm and 30 μm.

Electronic devices operable at Terahertz (THz) frequencies are desirable in many applications, such as medical applications (imaging), security detection of hostile objects and noxious chemicals, and others. The most common approach for THz generation is based on the use of a low temperature grown GaAs (LTG-GaAs) semiconductor with an appropriate antenna. These are the so-called "photoconductive antennas", utilizing the property of a photoconductor to respond to incident light by a change (decrease) in its resistance. The photoconductor is excited either by incident coherent light in the form of two beams of different wavelengths (using DFB lasers for example) creating a beat frequency in the THz range, or by an ultra short (picosecond) laser pulses creating ultra wide band THz emission.

The recently developed technique relating to THz emitters is disclosed in the International Patent Publication No. WO 2007/132459, assigned to the assignee of the present application. According to this technique a photoemission based electrodes' assembly (e.g. diode) is used, where photomixing is used for illumination of a photocathode which converts an input light signal into an electrical current in the THz range, which in turn operates a signal transmitter/receiver.

SUMMARY OF THE INVENTION

The present invention provides a novel configuration of an antenna suitable to be used in a THz transmitter and/or receiver, which is generally referred to as transceiver.

The present invention provides an antenna structure for a high frequency transceiver, while taking advantage of the technique described in the above-indicated publication WO 2007/132459 to the same assignee, namely utilizing the principles of free space propagation (in vacuum) of photoemitted electrons. Generally, the invention utilizes the principles of electron emission, such as thermo- or photo-emission. More specifically, the invention utilizes photo-emission and is therefore described below with respect to this specific application, but it should be understood that the invention is not limited to photoemission but should be interpreted in its broader aspect of electron emission from a cathode for free space propagation through a (vacuum) cavity.

According to the invention, an antenna structure (e.g. for THz emitter/receiver) comprises an electrodes' arrangement including two or more electrodes, where two of these electrodes are accommodated in a spaced-apart relationship defining a cavity for free space propagation of electrons between them. At least one of these at least two electrodes (or a part thereof) is responsive to an input signal, being an external optical field, to emit an electron flux (e.g. as a result of the photoelectric effect) towards the other electrode.

The electrodes' arrangement is configured to define first and second electrode portions (being portions of the same or different electrodes), where at least a region of the first portion is exposed to the electron flux and thus operates as an antenna feeding port (as being a source of electric current through the second portion), while the second portion operates as an antenna radiating portion (a transmitter/receiver) of high frequency (e.g. in the THz range) radiation caused by said electric current passing therethrough.

It should be noted that the principles of the present invention are applicable for transmitting and/or receiving high-frequency radiation. Therefore, the term "antenna radiating portion" should be interpreted as a portion of the antenna structure through which high frequency signal is transmitted and/or received. Generally speaking, the antenna radiating portion is that effecting antenna transmitting and/or receiving mode. In the transmission mode, the antenna radiating portion responds to an electric current through the antenna structure to transmit radiation of a respective frequency range; and in the receiving mode it responds to external radiation to effect a detectable change in the electric current.

Thus, according to one broad aspect of the invention, there is provided a high frequency radiation transceiver comprising an electrodes' arrangement comprising:

two or more electrodes, two of said two or more electrodes being accommodated in a spaced-apart relationship defining a cavity for free space propagation of electrons between them, wherein one of said two electrodes is configured to be responsive to an external input optical signal to emit an electron flux towards the other electrode, said two or more electrodes are configured to define first and second electrode portions, the first portion having at least a region thereof exposed to said electron flux and operable as an antenna feeding port causing an electric current in said second portion and the second portion being configured and operable as an antenna radiating portion The antenna radiating operation thus is capable of responding to the electric current flow therethrough by emission of the high frequency radiation (transmission mode), and is capable of responding to an external high frequency radiation signal by effecting a change in the electric current (receiving mode).

The electrodes' arrangement is preferably configured as a vacuum tube, i.e. the cavity of free space propagation of emitted electron is under vacuum conditions. The two electrodes are preferably accommodated with a small gap between them (up to a few microns), defining said cavity for free space propagation of electrons between the electrodes along the cavity axis, such that the cavity axis intersects said first portion while the second portion is located farer from the cavity axis. In this connection, it should be understood that a distance between the antenna feeding port and antenna radiating portion is lumped, e.g. is smaller than λ/10 (λ being the wavelength of transmitted/received radiation). Also, preferably, said at least two electrodes are configured with a substantially small capacitance between them. This can be implemented for example by configuring at least one of the electrodes as an electrically conductive grid.

In a preferred configuration, the antenna structure is activated by electron emission from photocathode to the antenna feeding port, which affects radiation transmission/receiving from the antenna radiating portion.

The electron flux may be generated by using the principles of photomixing in a photocathode, utilizing external light field in either a pulse mode or continuous wave (CW) mode, to produce the electron flux corresponding to a high frequency for feeding the antenna. For example, the input light field may be in the form of two light beams of two different wavelengths (e.g. produced by DFB lasers) different from one another a value (beating frequency) corresponding to the high frequency emission to be obtained. Alternatively, a pulse-mode laser may be used as a source of the input light field, to thereby cause generation of ultra short pulses of the electron flux from the photocathode. Considering the antenna structure operation in a receiving mode, as optical illumination beating frequency is substantially equal to the received THz frequency, the detected signal is a change in a DC component of electric current through the antenna with respect to that which would be measured when no THz radiation is received by the antenna. On the other (more attractive) case, in which there is a slight frequency difference between the two, the received signal is an IF harmonic that can be detected more easily without the need for lock-in amplifier.

Preferably, the second portion, which is operable as antenna radiating portion, i.e. for transmitting/receiving a high frequency (e.g. THz) radiation, is configured as a bow-tie antenna.

The configuration may be such that said first portion (being entirely or partially exposed to the electron flux) has at least a region thereof adapted to generate electrons of said electron flux in response to said external input signal. The input signal may be a light field causing emission of said electron flux from the respective electrode (or portion thereof).

The THz transceiver device may be configured such that the electric current in the antenna radiating portion propagates in opposite directions. The device thereby operates as a uni-polar antenna.

In some other embodiments, the first and second portions are integral portions of the same electrode. These two portions may be of the same or different geometry and/or shape and/or material composition. The electrode, having these two portions, is accommodated with respect to the other electrode such that the first portion is located at the interface of the cavity between the electrodes, and the second portion is farer from the cavity.

In some embodiments, the second portion, operable as a transceiver of THz radiation, is associated with the same electrode from said two electrodes defining the cavity between them. The second portion may for example have a V-shape.

The THz transceiver device may be configured such that the electric current in the second portion propagates in the same direction, thereby operating as a bi-polar antenna.

The configuration may be such that each of the two electrodes comprises said first and second integral portions, where the first portion of one of the electrodes is exposed to the external input signal (e.g. light field) for emitting the electron flux towards the first portion of the other electrode. Preferably, the two electrodes, defining the cavity for the electron flux propagation between them, are arranged such that the first portion of one of the electrodes is aligned with the first portion of the other electrode. In other words, the first portions of the two electrodes are located at the cavity axis.

In some other embodiments, the second portion has two separate regions located in said two electrodes respectively.

In yet further embodiments, at least a region of said second portion is spatially separated from the first portion. In this case, the electric current passing through said at least region of the second portion is a current induced by the electric current in said first portion.

In preferred embodiments of the invention, said electrodes' arrangement comprises a photocathode and an anode, the photocathode being adapted to emit the electron flux in response to the external light field. As described above, either one or both of the photocathode and anode may have the first and second portions; or the second portion may be spaced-apart from the photocathode and anode. Preferably, the device includes a substrate carrying the photocathode in a plane spaced apart from a plane of the anode to define said free space electron propagation cavity between them.

According to another aspect of the invention, there is provided a high frequency radiation transceiver comprising an electrode's arrangement comprising a photocathode electrode and an anode electrode spaced from said photocathode electrode along a cavity axis, said electrodes' arrangement defining first and second portions, the first portion being responsive to an electron flux generated by electron emission from the photocathode and thus being operable as an antenna feeding port causing an electric current flow through the second portion, and the second portion being configured and operable as an antenna radiating portion, responding to said electric current flow therethrough by emission of the high frequency radiation, and responding to an external high frequency radiation signal to effect a change in the electric current therethrough.

According to yet another aspect of the invention, there is provided a high frequency radiation emitter comprising at least two electrodes accommodated with a small gap between them defining a cavity for free space propagation of electrons, at least one of said at least two electrodes being configured to emit an electron flux in response to an external input optical signal, at least one of said at least two electrodes having first and second portions located respectively closer and farer from said gap, the first portion being exposed to said electron flux and operable as a source of electric current thus serving as an antenna feeding port, and the second portion being configured and operable as an antenna radiating portion for transmitting the high frequency radiation caused by the electric current in the first portion.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 5A shows the poles of AC power source connected in parallel to the bow tie center used in the conventional bow-tie antenna approach, FIG. 5B illustrates operating of the bow-tie antenna configuration while being integrated with a photoemission device, and FIG. 5C illustrates an effect of a notch in the bore sight (0° degrees) resulting from symmetrical current flow in the uni-polar bow-tie configuration of FIG. 5B;

DETAILED DESCRIPTION OF EMBODIMENTS

Figure 1:
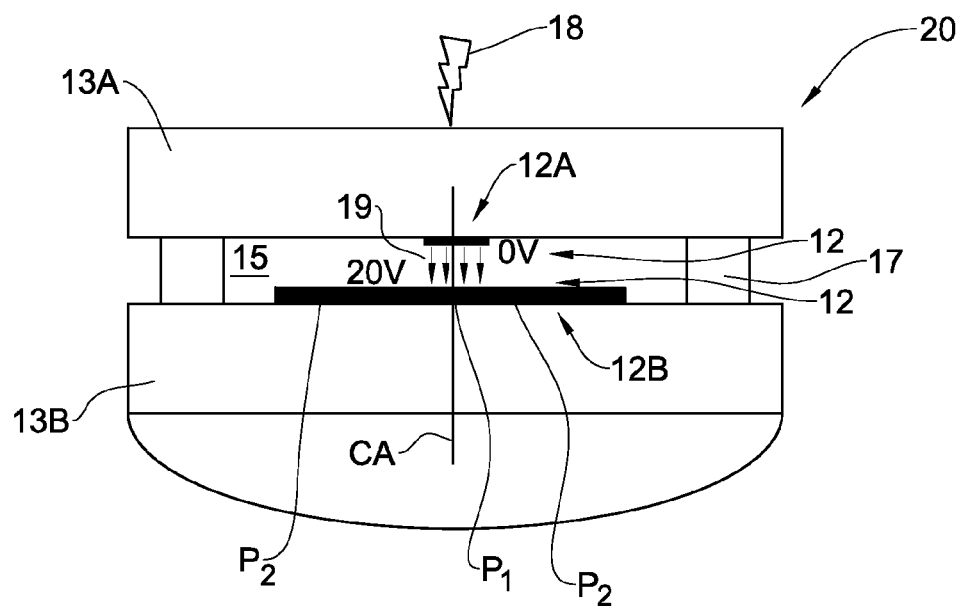
FIG. 1 is a schematic illustration of a high frequency transceiver device according to an embodiment of the present invention.

Reference is made to FIG. 1 exemplifying a THz transceiver device 20 utilizing an antenna structure of the present invention. In the present example, the device 20 is associated with a vacuum tube or a chamber. The device 20 includes an electrodes' arrangement, generally at 12, which is formed by two or more electrodes accommodated in a spaced-apart relationship, two such electrodes 12A, 12B being shown in the present example, defining a cavity 15 for free space propagation of electrons between them along a cavity axis CA. At least one of these electrodes, electrode 12A in the present example, is intended to be exposed to an external input optical signal (light field) 18 to emit, in response to said input signal, an electron flux 19 towards the other electrode 12B. Thus, the electrode 12A is a photocathode operable by input light signal to provide output electron flux 19 into the cavity 15.

Considering the high-frequency transceiver, the electron flux may be generated by using the principle of photomixing in photocathode 12A, utilizing external light field in either a pulse mode or continuous wave (CW) mode, to produce the electron flux corresponding to a high frequency for feeding the antenna. For example, the input light field may be in the form of two light beams of two different wavelengths (e.g. produced by DFB lasers) different from one another a value corresponding to the high frequency emission to be obtained. Alternatively, a pulse-mode laser may be used as a source of the input light field, to thereby cause generation of ultra short pulses of the electron flux from the photocathode 12A.

In the present not limiting example, backlight illumination of the photocathode 12A is used. The photocathode is located on an optically transparent substrate 13A (optical window) and is exposed therethrough to the external light field 18. It should, however, be understood that the photocathode may be excited by front side illumination, e.g. including direct illumination of the photocathode 12A and/or reflection from the anode electrode 12B. As exemplified in the figure, anode 12B is located on its substrate 13B, which may for example be transparent.

The gap (cavity) 15 between the photocathode and anode 12A and 12B is vacuum sealed by an appropriate sealing structure 17. The gap 15 size is appropriately selected (preferably is less than 1 micron, and generally not exceeds a few microns) to enable desirably high-power output from the antenna. To this end, the gap size should preferably meet the requirements for such conditions as a space charge effect and an electron transit time between the cathode and anode. More specifically, the space charge effect should be minimized, and the electron current signal should correspond linearly to the profile of the input light intensity by which the electron flux has been generated. In case of CW mode, the electron transit time should preferably be much shorter than the period of the beat-frequency signal; and in case of the pulse mode, the electron transit time should be much shorter than the pulse width.

As will be described more specifically further below with respect to multiple examples of the invention, the antenna structure of the invention has a feeding port ("antenna feeding port"), which is constituted in the present invention by the cathode-anode cavity, and has an antenna radiating structure coupled to said feeding port and located outside the cathode-anode cavity. The antenna radiating structure may be coupled to the cathode and/or anode electrode(s). Thus, the invention provides an electron emission based (typically, photoemission-based) electrodes' arrangement defining first and second functionally different electrode portions, feeding port and antenna radiating structure.

In the example of FIG. 1, the antenna radiating structure is a part of the anode electrode 12B. More specifically, the first and second functionally different electrode portions are both anode portions: the first portion $P_1$ (antenna feeding port) is exposed to the electron flux 19 and operates as a source of electric current through the second portion $P_2$ (antenna radiating structure). Portion $P_2$ operates for transmitting THz radiation caused by the electric current passing therethrough, or for receiving THz radiation identifiable (detectable) by a resulting electric field variation in the antenna feeding port $P_1$. It should be noted that in such a configuration the antenna radiating portion $P_2$ is located within the vacuum tube, being a part of the electrodes' arrangement 12. In this case, at least the substrate 13B is made of a material transparent for THz radiation.

As will be exemplified below, either one of the photocathode and anode electrodes may incorporate one of such first and second portions (antenna feeding and radiating portions), or both of them. In other words, any one or more electrodes in the photoemission-based electrodes' arrangement 12 may be configured as an antenna radiating portion.

Turning back to the example of FIG. 1, the second portion $P_2$ of the electrodes' arrangement is configured as a planar antenna radiating portion surrounding the antenna feeding port $P_1$. As further shown in this figure, an electromagnetic lens 26 may be used at the outer side of the anode 12B to improve the coupling of electromagnetic radiation to a free space.

It should be noted that according to the invention, the antenna radiating portion(s) $P_2$ may be located inside the phototube, and may be part of the cathode or of the anode or of both of them as will be exemplified further below. The antenna radiating portion $P_2$ may be made integral with the electrodes' arrangements in any known way such as lithography, metallization, etc. For example, the antenna containing electrode(s) may be printed on the substrate(s). Generally, the electron emission based (photoemission based) electrodes' arrangement including the antenna feeding port $P_1$ may generate AC current of any desired frequency limited by the photoemission mechanism (physical limitation), and accordingly the antenna radiating portion $P_2$ would emit radiation of the respective frequency, e.g. including THz, microwave.

Figure 2:
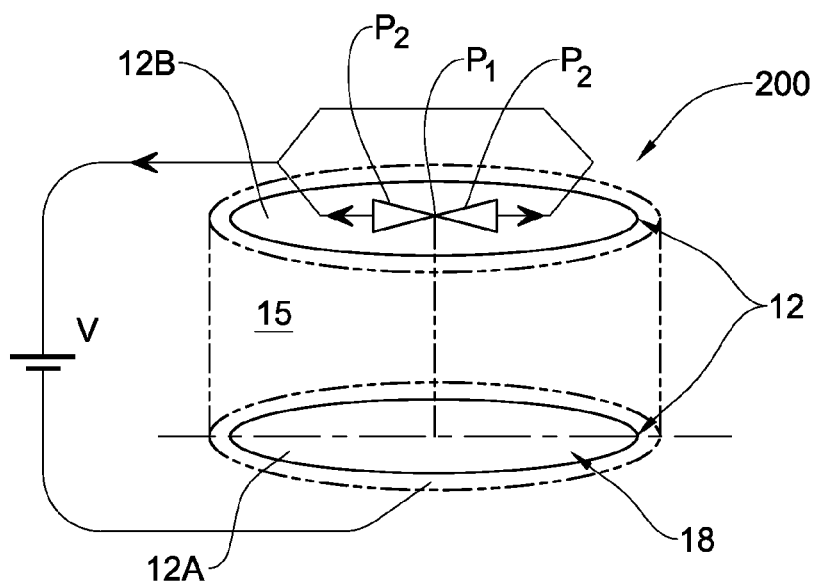
FIG. 2 shows more specifically the electrodes arrangement and an example of the antenna configuration in the device of the present invention, corresponding to uni-polar configuration.

Reference is made to FIG. 2 showing a more specific example of the configuration of the THz antenna 200 of the present invention. To facilitate understanding, the same reference numbers will be used for identifying components that are common in all the examples. The antenna 200 is incorporated in a vacuum photo-tube, and includes an electrodes' arrangement 12 including a photocathode 12A and an anode 12B which is spaced from the cathode 12A a certain small distance defining a small gap 15 between them, which forms the electron flux propagation cavity having a cavity axis CA. The cathode 12A (or at least a part thereof) is exposed to a light field 18. In this example, the anode 12B has first and second integral portions $P_1$ and $P_2$, where portion $P_1$ is a part of the antenna feeding port and portion $P_2$ is the antenna radiating portion. The electrodes' arrangement is associated with a voltage supply unit V. In the present example, the negative pole is connected to the photocathode 12A and the positive pole is connected to the antenna radiating portion $P_2$ of the anode 12B. Thus, interaction of the light field 18 with the photocathode 12A causes the electron flux 19 emission therefrom towards the first portion $P_1$ of the anode resulting in a corresponding electric current through the antenna radiating portion $P_2$. Accordingly, THz emission can be generated by said portion $P_2$ of the anode.

It should be understood that the present invention provides for incorporating the antenna directly within the photoemission-based electrodes' arrangement of a THz generator (in the present example of FIG. 2, the antenna is located at the anode plane, on the inner surface of the substrate 13B), thus avoiding electrical energy losses associated with electrical connectors (carrying the THz signals from the electrodes' arrangement to an external antenna). In particular, when the use of short wavelength signals (wavelengths between 1 mm and 30 μm) is considered, the antenna radiating portion should be as close as possible to its feeding port (preferably at a distance much shorter than the wavelength).

As noted above, the efficiency of the antenna 20 is strongly dependent on the anode-photocathode distance (the gap size). This is associated with the charge screening and transit time effects. More specifically, as the distance increases, more electrons, emitted during different time slots, remain traveling in the photo-tube in the gap between the photocathode and anode, thus negatively charging the gap and impeding further electrons emission from the cathode. Also, as the distance increases, the emitted electrons have to pass a longer path to the anode, thus inducing currents in the anode and cathode electrodes. When the transit time of electrons equals to the specific parameter of the illumination profile (periodicity in case of CW-mode, or pulse width in case of pulse-mode), the overall AC current through the device reduces considerably. Thus, preferably, in order to achieve high feeding efficiency of the antenna, the distance (gap size) between the anode 12B and photocathode 12A traversed by said electrons flux should be short enough to prevent, or at least significantly reduce, the space charge effect and to adjust the electron transit time, as described above. On the other hand, too short distance between the anode and cathode might cause an increase in the anode-cathode capacitance, which in turn would decrease the radiation power. Therefore, the antenna radiating portion $P_2$ is preferably appropriately distanced from the capacitor formed by the aligned (along the cavity axis) cathode and anode electrodes.

Figure 3A:
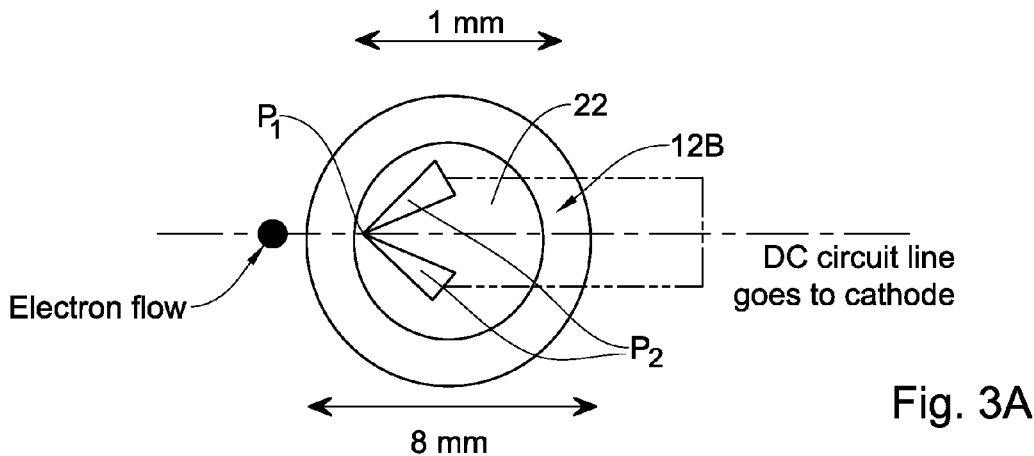
FIGS. 3A and 3B illustrate the top and side views of the electrodes' arrangement according to an example of the invention suitable to be used for increasing the device efficiency.
Figure 3B:
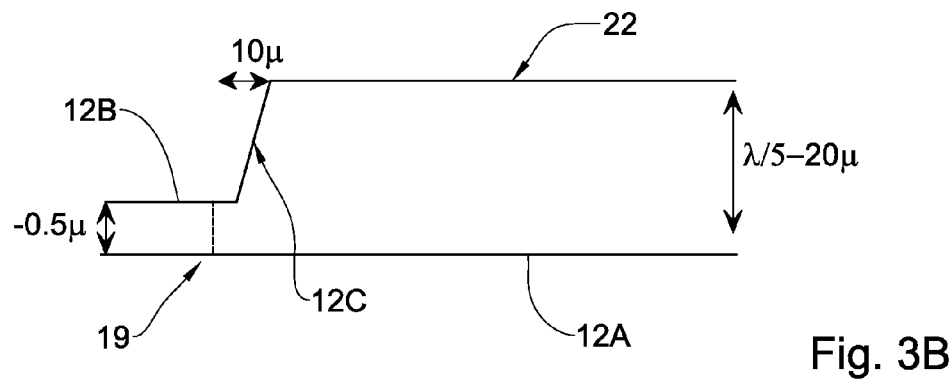

Reference is made to FIGS. 3A and 3B showing top and side views of the electrodes' arrangement, according to a specific but not limiting example, suitable to be used in the present invention for increasing the antenna efficiency. As shown in the figures, anode 12B has a first portion $P_1$ (antenna feeding port), a second portion $P_2$ (antenna radiating portion), and a coupling portion 12C. The antenna feeding port $P_1$ is located in a plane in proximity to the photocathode 12A plane, and the antenna radiating portion $P_2$ is located in a recessed region 22 of the anode 12B being in a plane at a larger distance from the photocathode 12A plane. The coupling portion 12C is aimed at providing proper excitation of the radiating portion $P_2$. Generally, the location of the feeding port $P_1$ with respect to the photocathode is selected to optimize the feeding efficiency, while the radiating portion $P_2$ is appropriately distanced from the metalized cathode plane to optimize the radiation efficiency. For example, for a proper operation of a device at THz frequencies, the cathode and the first portion $P_1$ of anode (feeding port) are located at about 0.5 μm distance (gap) between them, while the second portion $P_2$ (radiating portion) is spaced from the cathode plane a distance of about 20 μm. Keeping in mind that antenna cannot radiate efficiently while placed closely to a metal plane, it is clear that this configuration reduces significantly the space charge and transit time effects, without deteriorating the radiation efficiency.

It should be noted that the configuration of the anode electrode shown in these figures may be implemented in the cathode as well. It should also be noted that the anode recess 22 may be replaced by a protrusion, in which case the protrusion walls serve as said coupling portion 12C.

In the figure, the antenna has a V shaped bow-tie configuration, the purpose of which will be described further below.

Figure 4:
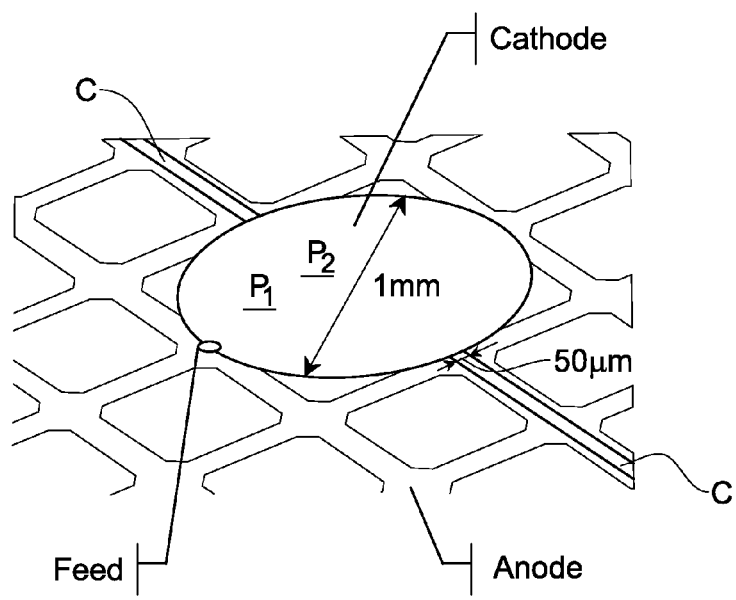
FIG. 4 shows another possible example for the configuration of the electrodes arrangement aimed at solving the anode-cathode distance problem.

Referring to FIG. 4, there is shown another possible example for the electrodes configuration aimed at solving the anode-cathode distance problem. In this example, at least one of the electrodes (e.g. anode 12B) has a grid-like configuration, while the cathode, having a substantially circular shape, entirely presents the coinciding first and second portions (feeding and radiating portions) $P_1$ and $P_2$. The second portion $P_2$ (antenna radiating portion) functions as a side-feeding circle antenna (or a V-shaped bow-tie antenna), and is connected, through narrow line conductors C, to a power source (not shown), providing the required potential difference between the anode and cathode.

Such a grid shape of the anode 12B decreases the capacitance of the anode-cathode, as a result of a decreased anode plate area. Since the capacitance is lower, smaller anode-cathode distances can be used, which in turn would increase the efficiency. The grid may for example have a line width of $\lambda\backslash 20$ and a line pitch of about $\lambda\backslash 4$. The anode-cathode distance may be $\lambda\backslash 20$.

Turning back to FIG. 2, the antenna radiating portion $P_2$, which transmits/receives the THz radiation, is configured as a bow-tie antenna. In this connection, reference is now made to FIGS. 5A to 5C showing how the bow-tie antenna can be used in some embodiments of the present invention, as compared to the conventional approach.

Figure 5A:
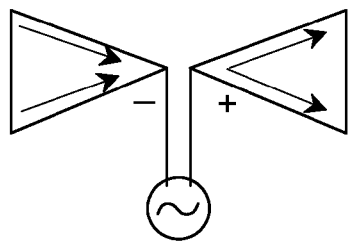
FIGS. 5A to 5C compare the operation of the bow-tie configuration in the antenna structure of the present invention and that of the conventional approach, where
Figure 5B:
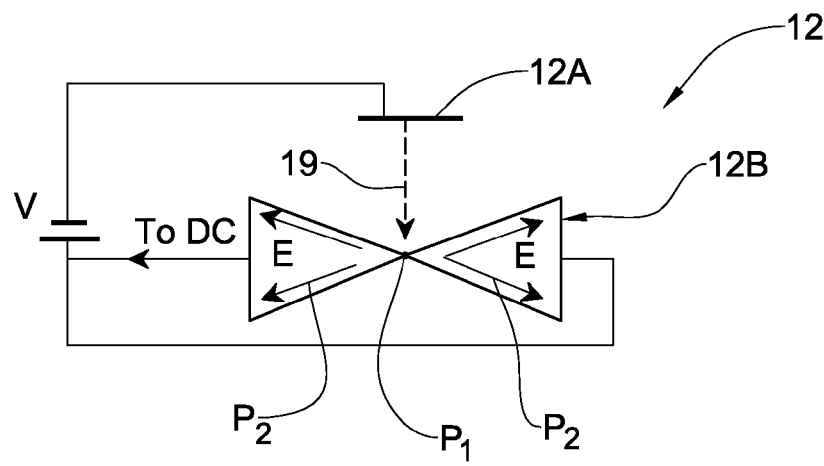
Figure 5C:
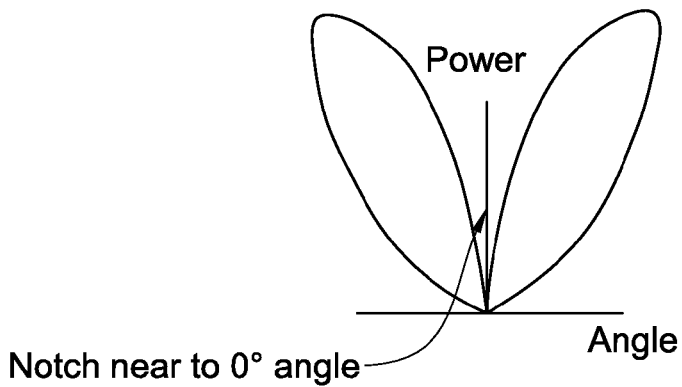

As shown in FIG. 5A, according to the conventional bow-tie antenna approach, both poles of an AC power source are connected in parallel to the bow tie center (e.g. between triangles). On the contrary, in the configuration of FIG. 5B, the DC power source V is connected by its one pole to a region at the periphery of bow-tie antenna (wide regions), which regions might actually form the antenna radiating portion $P_2$, and by its other pole is connected to the cathode 12A which is aligned with the center part of the bow-tie structure, and accordingly the center part serves as the feeding port $P_1$. The electron flux interaction with the first portion $P_1$ provides AC current in the THz range to the second portion $P_2$.

Thus, in the conventional bi-polar configuration of bow-tie antenna (FIG. 5A), the electric current through the antenna flows in the same direction. Operating the similar bow-tie arrangement (FIG. 5B) according to the principles of the invention (i.e. integrating it with the photoemission device) would result in the current flow in different directions from the first portion (feeding port) $P_1$ to the second portions (antenna radiating portions) $P_2$. The radiating portion $P_2$ thus operates as uni-polar antenna. As shown in this specific but not limiting example of FIG. 5B, the current flow through the uni-polar bow-tie is symmetric. As a result of such symmetrical current, the angular distribution of emitted radiation has a notch in the bore sight (0° degrees), as shown in FIG. 5C.

Figure 6:
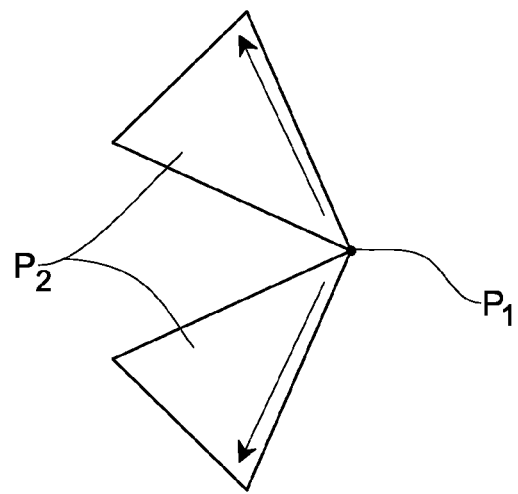
FIG. 6 shows an example of the electrode arrangement where "wings" of the antenna form a V shape, while the first portion is defined by the vertex of the V-configuration.

Turning back to FIG. 2, if the bow-tie antenna of the conventional geometry is used, it is further configured to provide unsymmetrical current flow therethrough to eliminate or at least significantly reduce the notch problem. An example for such configuration is shown in FIG. 6, where the "wings" of the antenna (defining the radiating portion $P_2$) form a V shape, the feeding port $P_1$ being defined by the base (vertex) of such V-configuration. This might result in the angular distribution being maximal at 0° degrees.

As indicated above, each of the photocathode and anode may be designed with the first and second functionally different portions. In this connection, reference is made to FIGS. 7A to 7C. In these examples, the cathode 12A has an active region AR which, when exposed to light 18, emits an electrons flux 19. This active region AR of the cathode serves as the antenna feeding region $P_{1C}$. The cathode further includes the second radiating portion $P_{2C}$ which is formed as an extension of the first portion away form the path of the electrons flux 19. The anode 12B has a geometry similar to that of the cathode namely defines first and second integral portions, $P_{1A}$ and $P_{2A}$. The first anode portion, $P_{1A}$, is aligned with the first cathode portion $P_{1C}$, thus defining the propagation path of electrons flux through the cavity between them and the gap size. The second anode and cathode portions, $P_{2A}$ and $P_{2C}$, extend from the respective first portions, $P_{1C}$ and $P_{1A}$, and from said electrons path towards opposite directions.

Figure 7A:
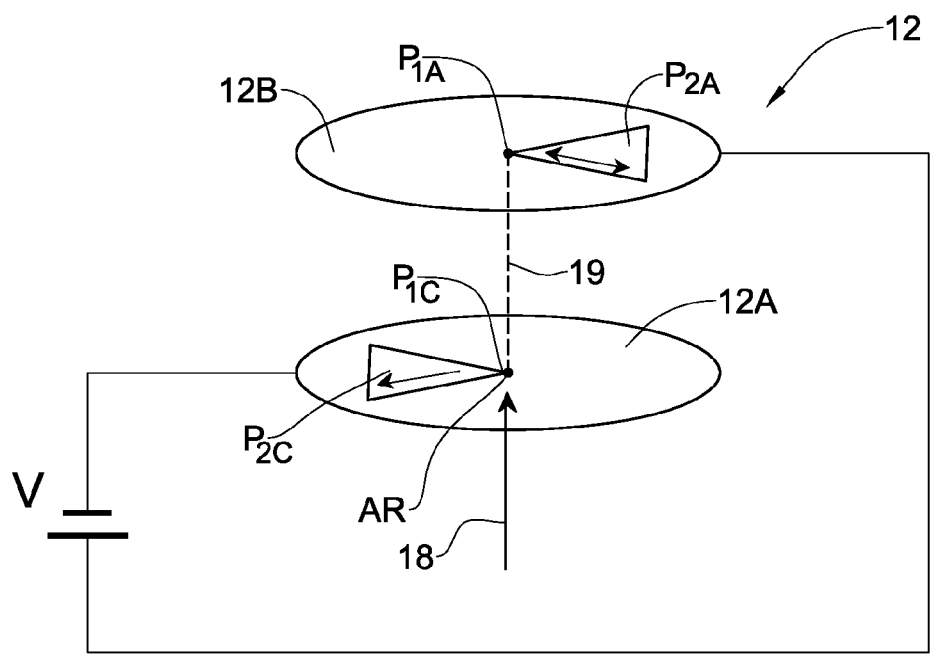
FIGS. 7A to 7C show three more example of the electrodes' arrangement according to the invention where the antenna portion is distributed between the cathode and anode electrodes.
Figure 7B:
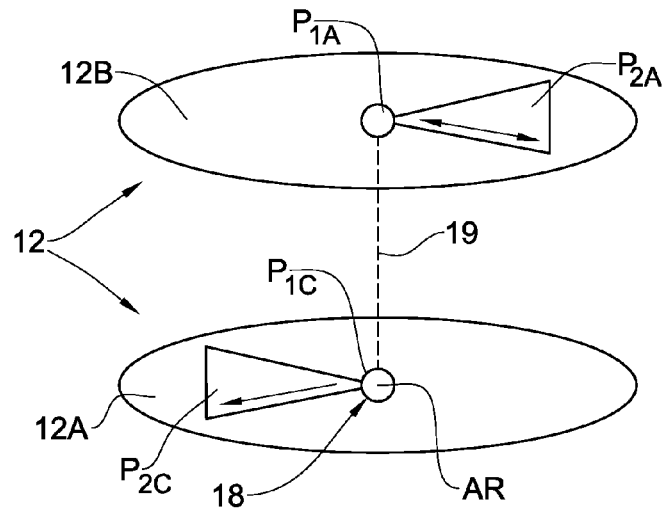
Figure 7C:
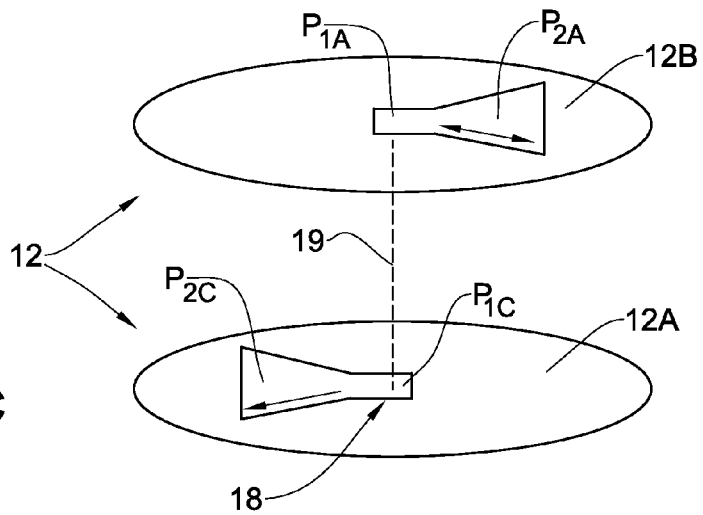

In the example of FIG. 7A, the dimensions of the respective first portions $P_{1A}$ and $P_{1C}$ are relatively small (point like regions) as compared to those of the examples of FIGS. 7B and 7C. As indicated above, these portions are to be aligned between them. Such alignment is easier to achieve with the configuration of FIG. 7B as compared to that of FIG. 7A, and even more easy with the configuration of FIG. 7C. Generally speaking, appropriately increasing the dimension of the first portions (antenna feeding ports) provides more flexibility to the alignment accuracy requirement (keeping in mind however that this may increase the capacitance of the electrodes). It should also be noted that in the above examples, the cathode is not a ground plane of the antenna in the anode, but a part of the antenna and therefore, there is no efficiency loss caused by the ground plane, except the capacitance between the overlapped part of the anode and cathode.

As shown in the figures, in these examples where the second, radiating portion (implementing said bow tie antenna) is distributed between the cathode 12A and anode 12B, and the electric current through the antenna radiating portion flows in the same direction thus corresponding to the bi-polar antenna configuration. As a result, the emitted radiation has maximum at the desired direction.

Figure 8:
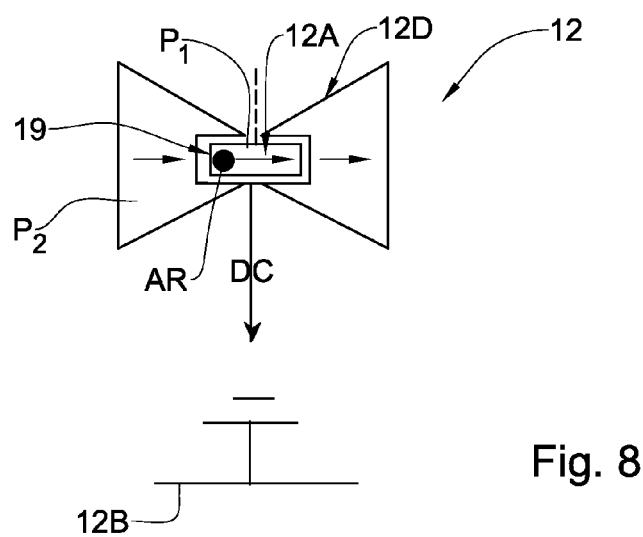
FIG. 8 shows yet further example of the electrodes arrangement in which the antenna portion is implemented as separate electrodes specially separated from the electrode containing the first portion.

Another possible example of the invention, free of notch related problem, is shown in FIG. 8. In this example, the electrodes arrangement 12 defines the antenna radiating portion $P_2$ as separate electrodes 12D specially separated from and associated with the first, feeding portion $P_1$ containing electrode, which is a photocathode 12A in the present example. The photocathode 12A (having a rectangular shape for example) has an active region AR emitting an electrons' flux in response to incident light, and presents by itself the antenna feeding portion $P_1$ of the electrodes arrangement 12. An electrical circuit of the antenna utilizing such electrodes arrangement is shown schematically in the figure, where the anode 12B is not specifically shown, but it should be understood that it is located above or below the cathode active region. Here, DC voltage supply is connected to the feeding portion $P_1$. Thus, electrons' flux (not shown) from the active region AR generates an electric current E through the first portion $P_1$, which in turn causes an induced electric current in the second portion $P_2$ thus feeding the antenna radiating portion $P_2$. The so-induced current flows in the two-part antenna $P_2$ in the same direction. In this specific, not limiting example, the feeding portion $P_1$ is constituted by the cathode-rectangle ($\lambda/2$ or $\lambda/4$) located inside and separated from the bow-tie antenna radiating portion $P_2$. It should be understood that the geometry of the antenna radiating portion is not limited to that of a bow-tie antenna, as well as the inside first portion may be of any suitable geometry and shape.

The invention claimed is:

1. A high frequency radiation transceiver operative in the terahertz regime within a frequency range between 300 GHz and 10 THz, and comprising an electrode's arrangement comprising two or more electrodes including a photocathode electrode and an anode electrode spaced from said photocathode electrode along a cavity axis, said electrodes' arrangement defining first and second portions, the first portion being responsive to an electron flux generated by electron emission from the photocathode and thus being operable as an antenna feeding port causing an electric current flow through the second portion, and the second portion being configured and operable as an antenna radiating portion, responding to said electric current flow therethrough by emission of the high frequency radiation, and responding to an external high frequency radiation signal to effect a change in the electric current therethrough.

2. A high frequency radiation transceiver according to claim 1, wherein said electrode arrangement is configured as a vacuum tube, said cavity being under vacuum conditions.

3. A high frequency radiation transceiver according to claim 1, wherein a distance between the antenna feeding port and the antenna radiating portion is smaller than $\lambda/10$, $\lambda$ being a mean wavelength of radiation range to be transmitted/received through said antenna radiating portion.

4. A high frequency radiation transceiver according to claim 1, wherein said two electrodes are configured to decrease capacitance between them.

5. A high frequency radiation transceiver according to claim 4, wherein at least one of said at least two electrodes is configured as an electrically conductive grid.

6. A high frequency radiation transceiver according to claim 5, wherein the grid has a line width of about $\lambda\backslash20$ and a line pitch of about $\lambda\backslash4$, a distance between said two electrodes along a cavity axis being about $\lambda\backslash20$, where $\lambda$ is a mean wavelength of radiation range to be transmitted/received through said antenna radiating portion.

7. A high frequency radiation transceiver according to claim 1, wherein said antenna radiating portion is configured as a bow-tie antenna.

8. A high frequency radiation transceiver according to claim 1, wherein said first and second portions are integral portions of the same electrode.

9. A high frequency radiation transceiver according to claim 1, wherein said second portion is associated with the same electrode of said two electrodes.

10. A high frequency radiation transceiver according to claim 8, wherein said second portion is configured as V-shaped portion.

11. A high frequency radiation transceiver according to claim 1, wherein said transceiver operates in accordance with one of the following:
the electric current propagates in different directions in the second, antenna radiating portion, the transceiver thereby operating as a uni-polar antenna structure; or
the electric current in the second portion propagates in the same direction, said second portion thereby operating as a bi-polar antenna radiating portion.

12. A high frequency radiation transceiver according to claim 1, wherein each of said two electrodes comprises said first and second integral portions, the first portion of one of the two electrodes being exposed to said external input optical signal for emitting the electron flux towards the first portion of the other of said two electrodes.

13. A high frequency radiation transceiver according to claim 1, wherein said second, antenna radiating portion has two separate regions, one region of the antenna radiating portion being located in one of said two electrodes and the other region is located in the other electrode.

14. A high frequency radiation transceiver according to claim 1, wherein at least a region of said second portion is spatially separated from the first portion, the electric current passing through said at least region of the second portion being induced by the electric current in said first portion.

15. A high frequency radiation transceiver according to claim 1, wherein the first and second portions are portions of either the photocathode or the anode.

16. A high frequency radiation transceiver according to claim 1, wherein each of the anode and cathode comprises the first and second portions, thus defining two first portions and two second portions, the two first portions constituting together said antenna feeding port, and the two second portions constituting together the antenna radiating portions.

17. A high frequency radiation transceiver according to claim 1, wherein the first portion of the cathode is aligned with the first portion of the anode along a cavity axis.

18. A high frequency radiation transceiver according to claim 1, wherein the second, antenna radiating portion is located in an additional electrode of the electrodes' arrangement which is spaced-apart from the photocathode and anode electrodes, the electric current in said second portion being induced by the electric current in the first portion located in the electrode spaced-apart from said additional electrode.

19. A high frequency radiation transceiver according to claim 1, comprising a substrate carrying the photocathode in a plane spaced apart from a plane of the anode to define said free space electron propagation cavity between them, at least one of the photocathode and the anode comprising said first and second integral portions.

20. A high frequency radiation emitter operative in the terahertz regime within a frequency range between 300 GHz and 10 THz, and comprising at least two electrodes accommodated with a small gap between them defining a cavity for free space propagation of electrons, at least one of said at least two electrodes being configured to emit an electron flux in response to an external input optical signal, at least one of said at least two electrodes having first and second portions located respectively closer and farer from said gap, the first portion being exposed to said electron flux and operable as a source of electric current thus serving as an antenna feeding port, and the second portion being configured and operable as an antenna radiating portion for transmitting the high frequency radiation caused by the electric current in the first portion.

21. A high frequency radiation emitter according to claim 20, wherein a distance between the antenna feeding port and the antenna radiating portion is smaller than $\lambda/10$, $\lambda$ being a mean wavelength of radiation range to be transmitted through said antenna radiating portion.

22. A high frequency radiation emitter according to claim 20, wherein said antenna radiating portion is configured as a bow-tie antenna.

23. A high frequency radiation emitter according to claim 20, wherein said first and second portions are integral portions of the same electrode.

24. A high frequency radiation transceiver according to claim 20, wherein said second portion is associated with the same electrode of said two electrodes.

25. A high frequency radiation emitter according to claim 24, wherein said second portion is configured as V-shaped portion.

26. A high frequency radiation emitter according to claim 20, wherein said emitter operates in accordance with any one of the following:
- the electric current in the second portion propagates in opposite directions, said second portion thereby operating as a uni-polar antenna structure;
- the electric current in the second portion propagates in the same direction, said second portion thereby operating as a bi-polar antenna radiating portion.

27. A high frequency radiation emitter according to claim 20, wherein each of said two electrodes comprises said first and second integral portions, the first portion of one of the two electrodes being exposed to said external input optical signal for emitting the electron flux towards the first portion of the other of said two electrodes.

28. A high frequency radiation emitter according to claim 20, wherein said second, antenna radiating portion has two separate regions, one region of the antenna radiating portion being located in one of said two electrodes and the other region is located in the other electrode.

29. A high frequency radiation emitter according to claim 20, wherein at least a region of said second portion is spatially separated from the first portion, the electric current passing through said at least region of the second portion being induced by the electric current in said first portion.

\* \* \* \* \*